Sept. 29, 1931. E. DE A. BRAGA 1,825,502
RESILIENT TIRE
Filed April 24, 1929
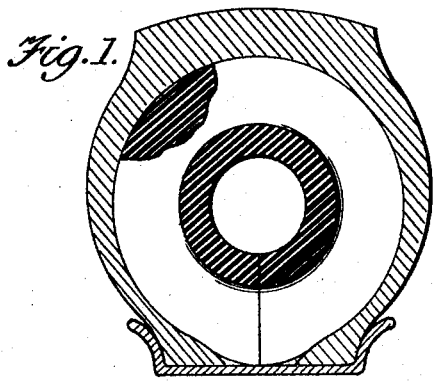
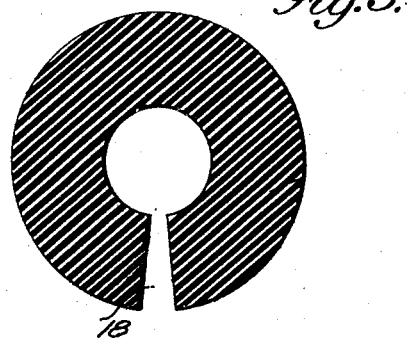
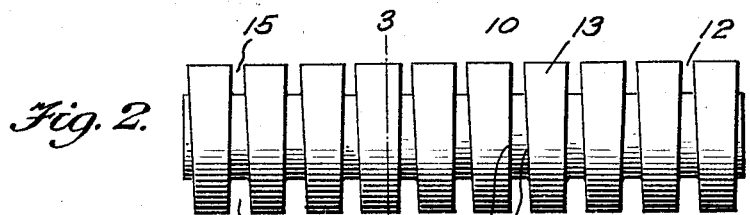
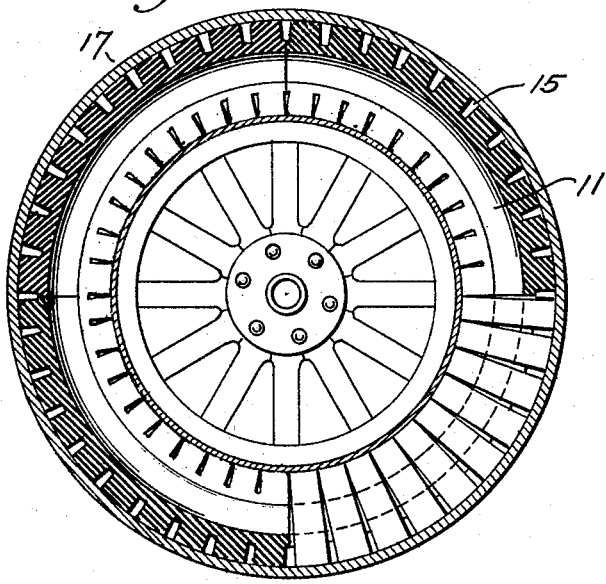
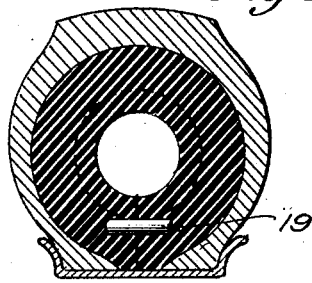
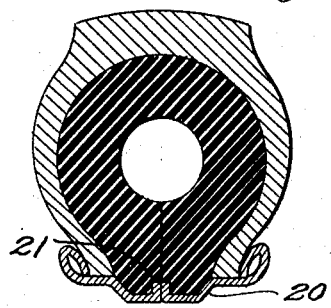
Eduardo de A. Braga
INVENTOR
BY Victor J. Evans
ATTORNEY Patented Sept. 29, 1931

1,825,502

UNITED STATES PATENT OFFICE

EDUARDO DE A. BRAGA, OF SAO PAULO, BRAZIL

RESILIENT TIRE

Application filed April 24, 1929. Serial No. 357,766.

This invention relates to resilient tires, an object being to provide a resilient filler which may be removably positioned within a tire casing to take up road shock and jar and eliminate the annoyance of punctures and blowouts frequently experienced with pneumatic tires, without sacrificing any of the easy riding qualities of pneumatic tires.

Another object of the invention is the provision of a tire filler of sectional formation which may be easily inserted within a tire casing, and which, when in position will hold the walls of the casing properly extended, yet provide proper resiliency so as not to interfere with the riding qualities of the tire.

With the above and other objects in view, the invention further includes the following novel features and details of construction, to be hereinafter more fully described, illustrated in the accompanying drawings and pointed out in the appended claims.

In the drawings:—

Figure 1 is a transverse sectional view illustrating the filler within a tire casing.

Figure 2 is an elevation of one section of the filler removed from the casing.

Figure 3 is an enlarged section on the line 3—3 of Figure 2.

Figure 4 is a sectional view illustrating the invention applied to a wheel with one section of the filler shown in elevation.

Figure 5 is a transverse sectional view showing a slightly different form of the invention.

Figure 6 is a like view illustrating the invention in use with a rim of a particular design.

Referring to the drawings in detail wherein like characters of reference denote corresponding parts, the filler which constitutes the present invention is preferably made up of a number of separate sections indicated generally at 10, one of said sections being shown in Figure 2 of the drawings. In Figure 4 the filler is shown as comprising four sections, but it is not the purpose of the present application to limit the invention to any particular number of sections.

As shown in Figure 2 of the drawings the sections 10 are elongated and are of cylindrical shape and provided with a longitudinally extending bore 11. The outside diameter of the sections conforms to the size of the casing with which the filler is to be used, and the diameter of the bore is proportionate to the load the tire is designed to carry, so that a proper thickness of material will be provided to insure the desired riding qualities.

The section 10 is provided with longitudinally spaced circumferential grooves 12 which define longitudinally spaced ribs 13, the grooves extending inward so that a substantially tubular member is provided around which the ribs 13 extend. The opposed walls of the grooves 12 are relatively inclined as shown at 14 so that the ribs are substantially wedge shaped in elevation as shown in Figure 2. By this means the portion 15 of the grooves is narrower than the diametrical opposite portion 16 when the section 10 is straight.

However, when the sections are flexed or curved within a tire casing 17 with the narrow portions 15 of the grooves outward and the wider portions 16 inward, due to the flexing of the section, the narrowest portion of the grooves will be upon the inner circumference of the filler and the wider portions will be arranged adjacent the tread of the tire. This construction of the filler sections provides for proper flexing of the sections to accommodate them to the shape of the tubes and provides a proper spacing around the outer circumference to hold the casing properly extended yet permit of the desired flexibility so as to insure easy riding qualities.

If desired, the sections 10 of the filler may be longitudinally split as shown at 18 to further increase the flexible character of the filler.

In Figure 5 the split walls of the sections are shown as connected by a fiber or other suitable pin 19 which may be vulcanized within the filler so as to prevent relative movement of the portions of the filler upon opposite sides of the split 18. This better adapts the filler for supporting heavy loads as it prevents relative movement of the adjacent walls along the split portions of the filler.

The sections are formed of rubber of the desired resiliency to insure proper support and riding comfort, and when the invention is used in connection with the type of rim shown at 20 in Figure 6 of the drawings, the central longitudinal bead 21 of this rim may be embedded in the filler.

In addition to the advantages of the invention previously set forth, the invention will also permit of the use of tire casings which have become worn to an extent where their use with pneuamtic tubes is prohibited.

Should any one of the ribs of a filler section become damaged through the use of a worn casing, or from any other cause, the damaged rib may be easily removed and another substituted, so that the entire section need not be renewed. A considerable saving and increased mileage is thus effected.

The invention is suspectible of various changes in its form, proportions and minor details of construction and the right is herein reserved to make such changes as properly fall within the scope of the appended claim.

Having described the invention what is claimed is:—

A tire core comprising a plurality of cylindrical shaped sections arranged in endwise relation within a tire and having longitudinally extending bores of the same diameter throughout the lengths of the sections to provide the sections of thicknesses of material to insure proper riding quality of the tire, each of said sections having longitudinally spaced circumferential grooves providing spaced ribs and the walls of said grooves relatively inclined to render the ribs substantially wedge-shaped when removed from the tire, said sections are positioned in the tire with the narrowest portions of the grooves disposed adjacent the tread of the tire and said sections slit longitudinally to the bores to increase the flexibility of said sections.

In testimony whereof I affix my signature.

EDUARDO de A. BRAGA.